Jan. 7, 1964 R. R. MANDY ETAL 3,116,505
FLUID RESPONSIVE SWITCH ACTUATING ASSEMBLY
Filed Dec. 12, 1961 3 Sheets-Sheet 1

INVENTORS
ROBERT R. MANDY
BY ERNEST E. LOVELL

*Lovell & Henderson*

ATTORNEYS

INVENTORS
ROBERT R. MANDY
BY ERNEST E. LOVELL

ATTORNEYS

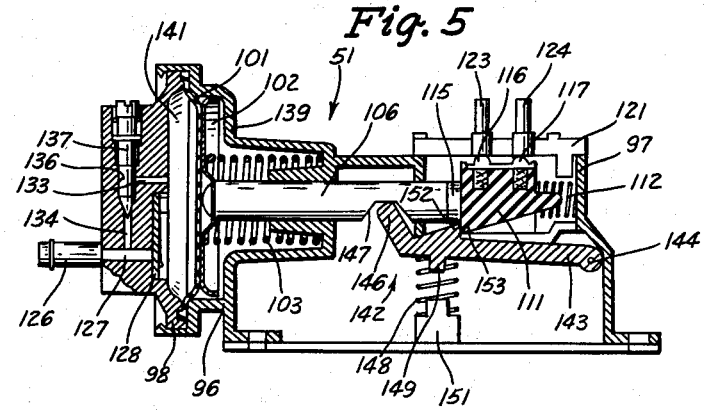
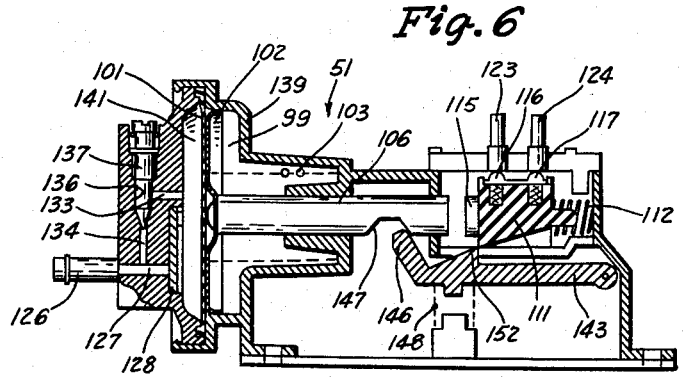

United States Patent Office 3,116,505
Patented Jan. 7, 1964

3,116,505
FLUID RESPONSIVE SWITCH ACTUATING
ASSEMBLY
Robert R. Mandy and Ernest E. Lovell, both of Detroit, Mich., assignors to The Delman Company, Cookeville, Tenn., a corporation of Tennessee
Filed Dec. 12, 1961, Ser. No. 158,669
8 Claims. (Cl. 15—250.02)

This invention relates to vehicle windshield clearing systems and more particularly to a system providing for the concurrent operation of a wiper unit and a washer unit and for operation of the wiper unit independently of the washer unit.

An object of this invention is to provide in a windshield clearing system an improved arrangement for concurrent operation of a wiper unit and a washer unit.

Another object of this invention is to provide in a windshield clearing system using a pressurized fluid for washing the windshield, a utilization of such pressurized fluid for concurrent operation of a wiper unit with a washer unit.

A further object of this invention is to provide in a washer system having a wiper unit and a washer unit, a device interposed in the fluid transmitting lines of the washer unit which is operatively connected to the wiper unit and fluid responsive to the actuation and de-actuation of the washer unit, to concurrently actuate the wiper unit with the washer unit, and to de-actuate the wiper unit at an interval of time subsequent to the de-actuation of the washer unit.

A further object of this invention is to provide a novel pressure actuated switch usable in a windshield clearing system or the like, wherein fluid pressure responsive means is provided for closing and opening the switch, and wherein means is provided for delaying the opening of the switch subsequent to a cessation of fluid pressure.

An object of this invention is to provide an arrangement for attaining the above mentioned objectives which is economical to manufacture, easy to install, and effective in service and operation.

These objects and advantages will become readily apparent by reference to the following description when taken in conjunction with the accompanying drawings, wherein:

FIG. 5 is a view similar to FIG. 4, and showing the switch in a closed position and the delay actuating means in one position; and FIG. 6 is a view similar to FIGS. 4 and 5, showing the switch in a closed position with the delay actuating means in a changed position.

Figure 1:
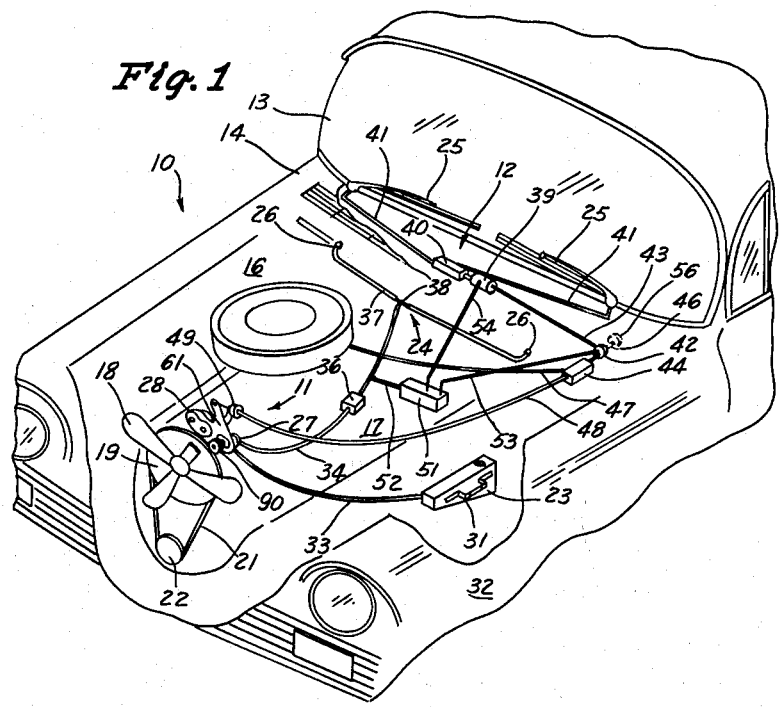
FIG. 1 is a fragmentary perspective view of a vehicle showing the invention in assembled relation therewith, with some parts broken away for purposes of clarity.

With reference to the drawings, there is illustrated in FIG. 1 a windshield clearing system as applied to an automobile 10 which includes a windshield washer unit and a windshield wiper unit designated generally as 11 and 12, respectively. The vehicle is illustrated as having a windshield 13 and an engine cowl 14 extended forwardly of the windshield. The automobile has the usual engine compartment 16 in which is mounted the engine 17, a water cooling fan 18, a pulley 19, and a fan belt drive 21 driven off a crankshaft pulley 22. The belt drive 21 may be viewed as an external element of the engine which is movable during operation of the engine.

The windshield washer unit 11 includes a fluid reservoir 23 from which fluid is supplied to a discharge unit 24 that includes a pair of nozzle devices 26 for directing the fluid against the windshield 13 and into the path of a pair of wipers 25. Fluid pressure is applied by a pump unit 27, interconnected between the reservoir 23 and the discharge unit 24, and pivotally mounted on a mounting unit 28 which is carried on the front of the engine 17 adjacent the pulley 19.

The fluid reservoir 23 is hung from a bracket 31 which is secured on the inside of a fender 32 of the vehicle 10, so as to be within the engine compartment 16. A fluid transmitting conduit 33 is connected between the reservoir 23 and the pump unit 27 to enable the latter unit, upon operation, to withdraw fluid from the reservoir 23, and then force the fluid under pressure through a conduit 34 to the nozzles 26.

The nozzle devices 26 of the fluid discharge unit 24 are shown as being mounted to the automobile directly in front of the cowl 14 in a spaced manner so that each device 26 services one side of the windshield 13. The nozzle devices 26 are of a known type embodying the jet principle, so as to emit and direct a high pressure stream of fluid against the windshield 13 and into the path of a respective wiper 25. A fluid conduit 37 connects each nozzle device 26 to a T-fitting 38, the conduit 34 being attached to the stem of the fitting 38. A one-way check valve 36 is interposed in the conduit 34 for the purpose of permitting fluid to flow through the conduit to the discharge unit 24, but preventing a backward or reverse flow therethrough toward the pump unit 27.

The wiper unit 12 includes an electric motor 39 adapted to operate a gear mechanism 40 which in turn operates a conventional transmission mechanism 41 for oscillating the wiper blades 25 across the windshield 13. The wiper motor 39 is operated by an on-off hand operated switch 42. The switch 42 is connected in a circuit including the vehicle battery (not shown), and is connected by a lead 43 to the wiper motor 39 for energization of the motor.

For the purpose of controlling and coordinating the operation of the washer and wiper units 11 and 12, respectively, a control unit is provided which includes a valve device 44 (FIG. 1) mounted on the dashboard (not shown) and connected by a rod 46 to the switch 42. The valve device 44 is also interconnected by a hose 47 with a source of fluid under suction pressure, such as the intake manifold of the engine 17. Another hose 48 is connected between the valve device 44 and an actuating device 49 for the pump unit 27, whereby suction pressure can be applied by the valve device 44 to the actuating device 49. The control unit also includes a fluid pressure responsive switch actuator, operation of which actuates and de-actuates the wiper motor 39 independently of the switch 42.

The switch actuator 51 is connected by a hose 52 to the conduit 34 for receiving fluid under pressure therefrom. The switch actuator 51 is also connected in circuit between the switch 42 and the wiper motor 39 by leads 53 and 54. As will be described more in detail hereinafter, by merely pulling, or pushing as the case may be, a knob 56 on the switch 42, the pump unit 27 will be actuated to discharge fluid through the nozzle devices 26 against the windshield 13; and the switch actuator 51 will be actuated to turn on the wiper motor 39 and to continue operation of the motor 39 for a predetermined interval of time after the pump unit 27 has stopped discharging fluid.

Figure 2:
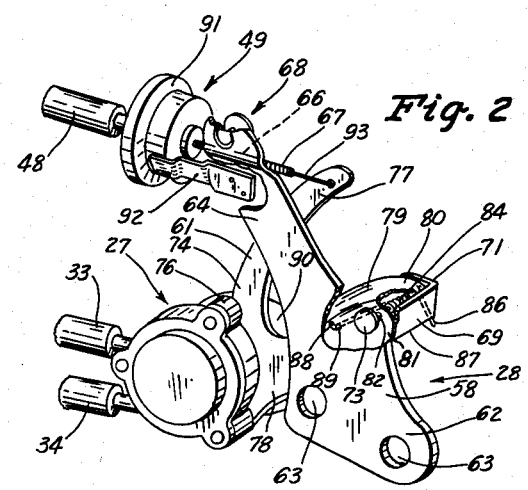
FIG. 2 is an enlarged, fragmentary perspective view of the pump assembly of FIG. 1, with some parts broken away for clarity of illustration.
Figure 3:
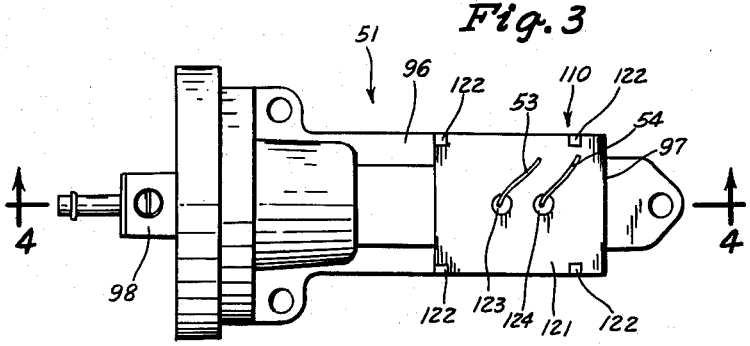
FIG. 3 is an enlarged, fragmentary top plan view of the pressure actuated switch of this invention.

Referring to FIG. 2, the mounting unit 28 for pivotally mounting the pump unit 27 adjacent the fan belt 21 includes a stationary bracket 58 which is secured to the front of the engine 17, and includes further a pivoting bracket 61. The stationary bracket 58 has a base portion 62 formed with openings 63 through which cap screws are inserted for attachment to the engine 17. The bracket 58 includes further an arm portion 64 extended from the base portion 62. A depression 66 is formed substantially transversely across the upper end of the arm 64 to receive an actuating wire unit 67, which is part of the actuating device 49. The unit 67 is secured in the depression 66 by a cap screw and washer arrangement 68 attached to the upper end of the arm 64. A flange 69 is extended laterally from the base portion 62 and has an element 71 bent at right angles so as to be parallel to the plane of the base portion 62, and a pair of aligned bores (not shown) are formed in the base portion 62 and the element 71 to receive a rivet or pivot pin 73.

The bracket 61 includes a base portion 74 adapted to be secured to one end 76 of the pump unit 27, an upper arm 77 to which the wire device 67 is attached, and a lower arm 78 to which the pivot pin 73 is connected. The lower arm 78 has a portion 79 flared outwardly and at right angles to the plane of the arm 78 and has a part 80 extended over the pivot pin 73. A shoulder member (not shown) depends from the outer edge of the flared portion 79 and extends parallel to and is spaced laterally from the outer end 81 of the lower arm 78. Aligned bores 82 (only one of which is shown) are formed, respectively, in the outer end 81 and in the depending shoulder member.

A coil spring 84 is inserted about the pivot pin 73 between the shoulder member and the outer end 81 of the arm 78, with one end 86 of the spring forcibly abutting the lower edge 87 (FIG. 2) of the flange 69, and the other end 88 of the spring 84 being bent so as to be inserted through an opening 89 formed in the lower arm 78.

By this arrangement, the spring 84 tends to bias the end 81 so as to move the lower arm 78 of the pivoting bracket 61, and thus the pump unit 27, clockwise with respect to the stationary mounting bracket 58, as viewed in FIG. 2, or counterclockwise as viewed in FIG. 1, whereby to normally maintain a driving wheel 90 of the pump unit 27 away from a contacting operating engagement with the fan belt 21.

The pump unit 27, attached to the pivoting bracket 61, is a conventional, rotary gear type fluid pump which has the function, by virtue of receiving rotational drive from the fan belt 21 via the driving wheel 90, of withdrawing fluid from the reservoir 23 through the conduit 33, and in turn forcing the fluid under pressure through the conduit 34 to the nozzles 26, and via the hose 52, to the switch actuator 51.

The actuating device 49 (FIG. 2), described in detail in U.S. Patent No. 3,000,033, issued September 19, 1961, is controlled by the valve device 44. The actuating device 49 comprises a circular housing 91 secured to the arm portion 64 of the stationary bracket 58 by a securing device 92. By this arrangement, the aforementioned actuating unit 67 which protrudes from one end of the device 49, is aligned with the groove 66 formed in the arm portion 64 so that the actuating wire 93 of the unit 67 may be readily attached to the upper arm 77 of the pivoting bracket 61. On application of a suction pressure to the actuating device 49 through the conduit 48, the wire 93 is moved to the left, as viewed in FIG. 2, to cause the driving wheel 90 to engage the fan belt 21, thus operating the pump unit 27.

Referring particularly to FIGS. 3–6 inclusive, the switch actuator 51 comprises a housing 96 (FIG. 3) closed at one end 97 and having a cover 98 (FIG. 4) for closing its opposite end. A chamber 99 is formed by the cover 98 and the housing 96 within which a diaphragm 101 is secured. The diaphragm 101 is normally held flat against the inner wall 100 of the cover 98 by means of a backup circular washer 102, and an actuator spring 103 inserted between the washer 102 and a spring guide 104 formed within the housing 96. A connector shaft 106 (FIG. 4) is secured to the washer 102 and extends through a bore 107 formed in the spring guide 104, and through another bore 108 formed in an interior wall 109 in the housing 96.

Figure 4:
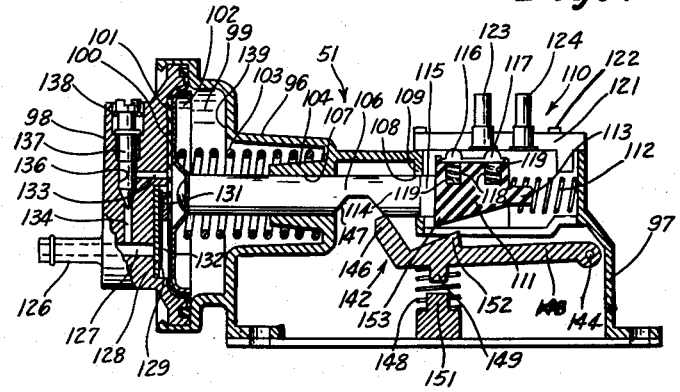
FIG. 4 is a sectional view taken along the line 4—4 of FIG. 3 and showing the switch in an open position.

Beyond the wall 109 a contact carrier 111 (FIG. 4), of plastic or the like, of an electric switch 110 is reciprocally mounted for coaxial movement relative to the connector shaft 106. A coil spring 112 is inserted between one end 113 of the carrier 111 and the housing end 97 and biases the carrier 111 toward the connector shaft 106. As best illustrated in FIG. 4, the other end 115 of the carrier is engaged with the outer end 114 of the connector shaft 106, which is illustrated in its normal position.

A pair of integral contacts 116 and 117 are carried by the carrier 111, and are biased upwardly by a pair of springs 118 carried in wells 119. Above the contacts 116 and 117, a terminal cap 121 is provided, and which is secured to the housing 96 as by corner tabs 122 (FIG. 3) bent thereover. The cap 121 is provided with a pair of terminals 123 and 124 spaced longitudinally apart a distance substantially equal to the longitudinal spacing between the contacts 116 and 117. The terminals 123 and 124, connected respectively to the leads 53 and 54 (FIG. 3) are longitudinally aligned with the contacts 116 and 117, and in the normal position of the diaphragm 101 and the contact carrier 111 of FIG. 4, the switch 110 is open as both terminals 123 and 124 are not in contacting or touching relation with their respective contacts 116 and 117.

The cover 98 (FIG. 4), has a fluid fitting 126 adapted for connection with the hose 52 (FIG. 1) whereby fluid discharged from the pump unit 27 is transmitted through the fitting 126 and a passage 127 against a flap valve 128. The flap valve 128 normally covers and is held tight over the passage 127 by means of a spring 129 and a retainer 131; the flap valve 128, spring 129 and retainer 131 all being mounted within a cavity 132 formed in the inner wall 100 of the cover 98.

Above the passage 127 (FIG. 4), another passage 133 is formed in the cover 98, and which communicates with a third passage 134 leading back to the inlet passage 127 by means of a threaded bleed bore 136. A pointed bleed screw 137 is threaded into the bore 136, and is provided with an O-ring 138 for sealing purposes. It will readily be appreciated that upon washing fluid being transmitted through the inlet passage 127, the flap valve 128 will open and the fluid will enter the cavity 132. The resulting fluid pressure will force the diaphragm 101 to the right, as viewed in FIGS. 4 and 5, until the washer 102 engages the opposite wall 139 of the housing chamber 99.

In response to the movement of the diaphragm 101 and the connector shaft 106 to their operative, or second positions, the contact carrier 111 (FIG. 5) is also moved from its first position, where the switch 110 is open, to a second operative position where the switch 110 is closed. This occurs due to the contacts 116 and 117 being moved into contacting relation with their respective terminals 123 and 124. Thus, in response to the operation of the pump unit 27, as actuated by operation of the valve device 44 (FIG. 1), and simultaneously with the discharge of fluid through the nozzle device 26 against the windshield 13, the wiper motor 39 is energized and the wiper blades 25 are oscillated.

The concurrent operation of both washer and wiper units 11 and 12, respectively, continues so long as the pump unit 27 is operated. However, upon operation of the knob 56 to close off the pump actuating device 49 from the suction pressure, withdrawal of the pump unit driving wheel 90 from the fan belt 21 stops the operation of the pump unit 27. The resulting withdrawal of fluid discharge into the switch actuator 51 permits a return of the diaphragm 101, due to the compression of the spring 103, from its operative position shown in FIG. 5 to its inoperative position shown in FIG. 4.

The rate of return of the diaphragm 101 is determined by the adjustment of the bleed screw 137 within the bore 136. Thus, as liquid under pressure has been built up within an expansible chamber 141 (FIG. 5) and as the pressure forces the flap valve 128 to close over the inlet passage 127, the rate of discharge flow of the fluid through the passages 133 and 134 is entirely dependent upon the setting of the bleed screw 137 within the bore 136.

It can readily be appreciated that as the diaphragm slowly, or quickly as the case may be, returns to its normal inoperative position, the electric switch contact carrier 111 also moves out of engagement with the terminal cap 121, thus opening the switch 110 and de-actuating the wiper motor 39. To ensure a delayed return movement of the switch contact carrier 111, whereby the wiper motor 39 continues to operate for an interval of time subsequent to the cessation of the flow of fluid through the conduit 34, the switch actuator 51 is provided with a delay lever unit 142 (FIGS. 4–6 inclusive).

The delay lever unit 142 includes a lever 143 pivotally mounted at 144 to the housing 96 and having an upturned cam follower end 146 adapted to ride in and out of a cam depression 147 formed in the connector shaft 106. A spring 148 is mounted between respective guides 149 and 151 provided on the lever 143 and the housing 96, and a catch 152 is formed on the lever 143 for engagement with the downwardly projected forward end 153 of the contact carrier 111.

In the normal inoperative position of the switch actuator 51 in FIG. 4, the delay lever 143 is depressed against the bias of the spring 148 and the catch 152 is spaced from the contact carrier forward end 153. However, when the connector shaft 106 has been moved to the right as viewed in FIG. 5, in response to a fluid discharge, the lever end 146 has moved up into the cam depression 147 and the catch 152 has engaged the contact carrier forward end 153.

Referring now to FIG. 6, the diaphragm 101 is shown partially returned to its original inoperative position in response to the cessation of fluid discharge by the washer unit pump unit 27. Conversely, although the lever 143 has moved to a lower pivoted position in response to the movement of the connector shaft, the lever catch 152 remains engaged with the contact carrier forward end 153. Thus the connector shaft 106 moves away from and is spaced from the carrier end 115 (FIG. 5), and the contact carrier 111 is momentarily retained in its operative position. By this arrangement, the wiper motor 39 remains in operation after the washer unit 11 has ceased to discharge fluid against the windshield 13.

It can readily be appreciated that upon a complete return of the diaphragm 101 and the connector shaft 106 to their inoperative positions of FIG. 4, the delay lever 143 is returned to its inoperative position of FIG. 4. Thus, upon a release of the contact carrier 111 by the lever 143, the compression of the spring 112 quickly forces the contact carrier 111 into engagement with connector shaft 106. As the contacts 116 and 117 are removed from contacting engagement with their respective terminals 123 and 124, the switch 110 is opened and the wiper motor 39 is de-energized.

Although a preferred embodiment of this invention has been described herein, various modifications and alternate construction may be made thereto without departing from the full scope of the invention as defined by the appended claims.

We claim:

1. In a vehicle having a windshield with a wiper therefor and an engine with an external element movable during operation of the engine, a system for clearing the windshield comprising:
   (a) fluid discharge means operable upon contact with the element to discharge a fluid against the windshield,
   (b) motor means for moving the wiper,
   (c) circuit means including a first switch for energizing said motor means,
   (d) operator-actuated control means operatively connected to said fluid discharge means,
   (e) a second switch in said circuit means for energizing said motor means and including a contact carrier biased toward a first position wherein said second switch is open, and movable to a second position wherein said second switch is closed,
   (f) diaphragm means including a connector engageable with said contact carrier and selectively movable, in response to said fluid discharge, between first and second positions wherein said second switch is respectively open and closed, and
   (g) means for holding said contact carrier in said second position independent of said connector thereby rendering said connector temporarily ineffective during initial movement of the connector toward said first position, said connector subsequently engaging said means to release the contact carrier thereby permitting the contact carrier to be biased to the first position whereby said second switch is opened subsequent to the cessation of said fluid discharge.

2. In a vehicle having a windshield with a wiper therefor and an engine with an external element movable during operation of the engine, a system for clearing the windshield comprising:
   (a) fluid discharge means operable upon contact with the element to discharge a fluid against the windshield,
   (b) motor means for moving the wiper,
   (c) circuit means including a first switch for energizing said motor means,
   (d) operator-actuated control means operatively connected to said fluid discharge means,
   (e) a second switch in said circuit means for energizing said motor means,
   (f) diaphragm means including a connector engageable with said second switch and movable, in response to alternate application thereto and withdrawal therefrom of said discharged fluid, to selectively open and close said second switch, and
   (g) means operatively engageable with said connector and said second switch for holding said second switch closed independent of said connector thereby temporarily rendering said connector ineffective, said means being operable in response to movement of said connector to release said second switch thereby delaying the opening of said second switch subsequent to said fluid discharge.

3. In a vehicle having a windshield with a wiper therefor and an engine with an external element movable during operation of the engine, a system for clearing the windshield comprising:
   (a) fluid discharge means operable upon contact with the element to discharge a fluid against the windshield,
   (b) motor means for moving the wiper,
   (c) circuit means including a first switch for energizing said motor means,
   (d) operator-actuated control means operatively connected to said fluid discharge means,
   (e) a second switch in said circuit means for energizing said motor means and including a contact carrier biased toward a first position wherein said second switch is open, and movable to a second position wherein said second switch is closed,
   (f) diaphragm means including a connector engageable with said contact carrier and selectively movable, in response to said fluid discharge, between first and second positions wherein said second switch is respectively open and closed, and
   (g) means operatively engaged with both said connector and said contact carrier for holding said carrier in said second position independent of said connector, said means movably responsive to movement of said connector towards its first position to disengage said means from the carrier thereby permitting said carrier to be biased to the first position.

4. In a vehicle having a windshield with a wiper therefor and an engine with an external element movable during operation of the engine, a system for clearing the windshield comprising:
  (a) fluid discharge means operable upon contact with the element to discharge a fluid against the windshield,
  (b) motor means for moving the wiper,
  (c) circuit means including a first switch for energizing said motor means,
  (d) operator-actuated control means operatively connected to said fluid discharge means,
  (e) a second switch in said circuit means for energizing said motor means and including a contact carrier biased toward a first position wherein said second switch is closed,
  (f) diaphragm means including a connector engageable with said contact carrier and selectively movable, in response to said fluid discharge, between first and second positions wherein said second switch is respectively open and closed, and
  (g) means for delaying the opening of said second switch relative to the cessation of said fluid discharge including a pivotal lever engaged with said connector, said lever movable from a position spaced from said contact carrier when said connector is in its first position to a position engaged with said contact carrier when said connector is in its second position, said lever operable to temporarily hold said contact carrier in its second position during movement of said connector toward its first position.

5. A switch actuating assembly comprising:
  (a) a housing having a chamber formed therein,
  (b) means formed in said housing for directing a fluid under pressure into and out of said chamber at first and second rates of flow, said first rate being faster than said second rate,
  (c) diaphragm means including a connector mounted in said chamber and biased toward a first position, said diaphragm means movable to a second position in response to movement of said fluid into said chamber,
  (d) an electric switch mounted on said housing and including a contact carrier separable from said connector of the diaphragm means, said contact carrier biased into engagement with the connector of said diaphragm means in said first position whereat said switch is open, said contact carrier movable to a position to close said switch in response to movement of said diaphragm means to said second position, and
  (e) delay means movably mounted within said housing and operable upon movement of said diaphragm means to said second position to engage and to retain said contact carrier momentarily in said switch closed position independently of said diaphragm means during movement of said diaphragm means to said first position.

6. A switch actuating assembly comprising:
  (a) housing having a chamber formed therein,
  (b) diaphragm means movably mounted in said chamber and including a connector,
  (c) means formed in said chamber for transmitting a fluid under pressure to and from said chamber whereby said connector is alternately movable between first and second positions,
  (d) an electric switch connected to said housing and including a contact carrier separable from said connector, said contact carrier biased into engagement with said connector in said first position whereat said switch is open, said contact carrier movable to a position to close said switch in response to movement of said connector to said second position, and
  (e) lever means movably connected to said housing and operable in said second position of said connector to retain said contact carrier in said switch closed position, said lever means movably responsive to said connector upon movement thereof toward said first position to momentarily retain said contact carrier in said switch closed position.

7. A switch actuating assembly comprising:
  (a) a housing having a chamber formed therein,
  (b) diaphragm means movably mounted in said chamber and including a connector,
  (c) means formed in said chamber for transmitting a fluid under pressure to and from said chamber whereby said connector is alternately movable between first and second positions,
  (d) an electric switch connected to said housing and including a contact carrier separable from said connector, said contact carrier biased into engagement with said connector in said first position whereat said switch is open, said contact carrier movable to a position to close said switch in response to movement of said connector to said second position, and
  (e) means including a lever pivotally connected to said housing and biased into engagement with said connector, said lever movable into engagement with said contact carrier upon movement of said connector to its second position, said lever movably engageable with said contact carrier upon movement of said connector toward its first position whereby to momentarily retain said contact carrier in said switch closed position, said lever spaced from said contact carrier when said connector is in its first position.

8. A windshield clearing system for a vehicle having a windshield and a wiper positioned on said windshield comprising:
  (a) fluid discharge means operable to dispense fluid against the windshield,
  (b) motor means for reciprocating the wiper over the windshield,
  (c) circuit means including a first switch for energizing said motor means,
  (d) a second switch in said circuit means for energizing said motor means and including a contact carrier biased toward a first position wherein said second switch is open and movable to a second position wherein said second switch is closed,
  (e) diaphragm means engageable with said contact carrier and selectively movable in response to the fluid pressure of the dispensed fluid between first and second positions wherein said second switch is respectively open and closed, and
  (f) means for holding said contact carrier in said second position independent of said diaphragm means thereby rendering said diaphragm means temporarily ineffective during the initial movement thereof toward said first position, said diaphragm means subsequently engaging said means to release the contact carrier thereby permitting the contact carrier to be biased to the first position opening said second switch subsequent to the cessation of the dispensing fluid onto the windshield.

References Cited in the file of this patent
UNITED STATES PATENTS

| | | |
|---|---|---|
| 2,877,485 | Oishei | Mar. 17, 1959 |
| 2,930,066 | Deibel | Mar. 29, 1960 |
| 3,000,033 | Webb | Sept. 19, 1961 |